United States Patent
Hossain

(10) Patent No.: US 10,701,247 B1
(45) Date of Patent: Jun. 30, 2020

(54) SYSTEMS AND METHODS TO SIMULATE PHYSICAL OBJECTS OCCLUDING VIRTUAL OBJECTS IN AN INTERACTIVE SPACE

(71) Applicant: Meta View, Inc., San Mateo, CA (US)

(72) Inventor: Zahid Hossain, Hayward, CA (US)

(73) Assignee: Meta View, Inc., San Mateo, CA (US)

( * ) Notice: Subject to any disclaimer, the term of this patent is extended or adjusted under 35 U.S.C. 154(b) by 0 days.

(21) Appl. No.: 15/791,163

(22) Filed: Oct. 23, 2017

(51) Int. Cl.
| | |
|---|---|
| G06T 3/00 | (2006.01) |
| H04N 5/222 | (2006.01) |
| G06T 11/60 | (2006.01) |
| H04N 5/262 | (2006.01) |
| G06T 7/20 | (2017.01) |

(52) U.S. Cl.
CPC ......... H04N 5/2226 (2013.01); G06T 3/0056 (2013.01); G06T 7/20 (2013.01); G06T 11/60 (2013.01); H04N 5/2621 (2013.01); H04N 5/2622 (2013.01)

(58) Field of Classification Search
CPC .. H04N 5/2226; H04N 5/2621; H04N 5/2622; G06T 3/0056; G06T 7/20; G06T 11/60
See application file for complete search history.

(56) References Cited

U.S. PATENT DOCUMENTS

| | | | |
|---|---|---|---|
| 8,274,535 B2 | 9/2012 | Hildreth | |
| 8,351,651 B2 | 1/2013 | Lee | |
| 9,304,594 B2 | 4/2016 | Finocchio | |
| 9,469,558 B2 | 10/2016 | Regmi | |
| 9,665,767 B2 | 5/2017 | Guan | |
| 9,772,679 B1 | 9/2017 | Schiewe | |
| 2011/0080490 A1 | 4/2011 | Clarkson | |
| 2011/0142353 A1 | 6/2011 | Hoshino | |
| 2012/0319945 A1 | 12/2012 | McCarthy | |
| 2013/0278501 A1 | 10/2013 | Bulzacki | |
| 2015/0142394 A1* | 5/2015 | Mehr | G06F 17/50 703/1 |
| 2015/0253863 A1 | 9/2015 | Babin | |
| 2015/0253864 A1 | 9/2015 | Parkhomenko | |
| 2017/0154214 A1 | 6/2017 | Freeman | |
| 2017/0235143 A1 | 8/2017 | Chi | |
| 2017/0352091 A1* | 12/2017 | Chen | G06T 19/20 |
| 2018/0139431 A1* | 5/2018 | Simek | H04N 13/232 |

\* cited by examiner

*Primary Examiner* — Chong Wu

(57) ABSTRACT

A system and method to simulate physical objects occluding virtual objects within an interactive space may obtain output signals conveying three-dimensional positions of surfaces of a user object. The three-dimensional positions may be conveyed in a point cloud. Point cloud images may be obtained from the output signals. An individual point cloud image may depict a two-dimensional representation of the point cloud. A current point cloud image may be aggregated with one or more previous aggregate point cloud images to generate a current aggregate point cloud image. A mesh may be generated based on the current aggregate point cloud image. The mesh may include a set of vertices. The mesh may be generated by assigning individual vertices to individual points in the current aggregate point cloud image.

18 Claims, 9 Drawing Sheets

SYSTEMS AND METHODS TO SIMULATE PHYSICAL OBJECTS OCCLUDING VIRTUAL OBJECTS IN AN INTERACTIVE SPACE

FIELD OF THE INVENTION

The system and methods described herein relate to simulating physical objects occluding virtual objects within an interactive space.

BACKGROUND OF THE INVENTION

There are many types of vision systems that provide virtual or augmented reality displays. In particular, wearable technology such as head mounted displays (HMD) is becoming more popular. User experiences with virtual objects of a virtual or augmented reality environment are generally enhanced when those experiences closely resemble a user's experience with interacting with real-world objects.

SUMMARY

The systems and methods described herein facilitate simulating physical objects occluding virtual objects within an interactive space. By accurately portraying occlusion of virtual objects by a physical object, the user's experience with the interactive space and/or virtual objects perceived to be present in the real world may more closely resemble interactions of the physical object with other physical objects in the real world.

The interactive space may include one or more of a virtual reality environment, an augmented reality environment, and/or other interactive spaces. An "augmented reality environment," as used herein, may refer to a space that represents a virtual environment that may be superimposed over a perspective of a physical real-world environment around a user. An augmented reality environment may include attributes of a virtual environment, including virtual objects superimposed over portions of the physical environment. A virtual reality environment may refer to a space that includes the virtual environment. The terms "space" and "environment" may be used interchangeably herein.

A system configured to configured to simulate physical objects occluding virtual objects within an interactive space may include one or more of a distancing device, one or more physical processors, and/or other components. The one or more physical processors may be configured by machine-readable instructions. The machine-readable instructions may include one or more computer program components. The one or more computer program components may include one or more of an input component, an aggregate component, a mesh component, and/or other components.

The input component may be configured to obtain output signals from a distancing device. The output signals may convey position information and/or other information. The position information may include three-dimensional positions of surfaces of real-world objects. The real-world objects may include a user object. The position information may be comprised of a point cloud. The point cloud may include a set of points that lie on the surfaces of the user object. The position information may specify individual three-dimensional positions of individual points in the set of points such that the individual three-dimensional positions of the individual points are on or near the surfaces of the user object.

The aggregate component may be configured to obtain point cloud images from the sensor output. An individual point cloud image may depict a two-dimensional representation of the point cloud.

The aggregate component may be configured to aggregate point cloud images over time. For example, a current point cloud image may be aggregated with one or more previous aggregate point cloud images to generate a current aggregate point cloud image.

The mesh component may be configured to generate a mesh based on the aggregate point cloud images and/or other information. The mesh may include a set of vertices and/or other components. The mesh may be generated by assigning individual vertices of the mesh to individual points represented in a current aggregate point cloud image.

These and other objects, features, and characteristics of the present disclosure, as well as the methods of operation and functions of the related components of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the any limits. As used in the specification and in the claims, the singular form of "a", "an", and "the" include plural referents unless the context clearly dictates otherwise.

DETAILED DESCRIPTION

Figure 1:
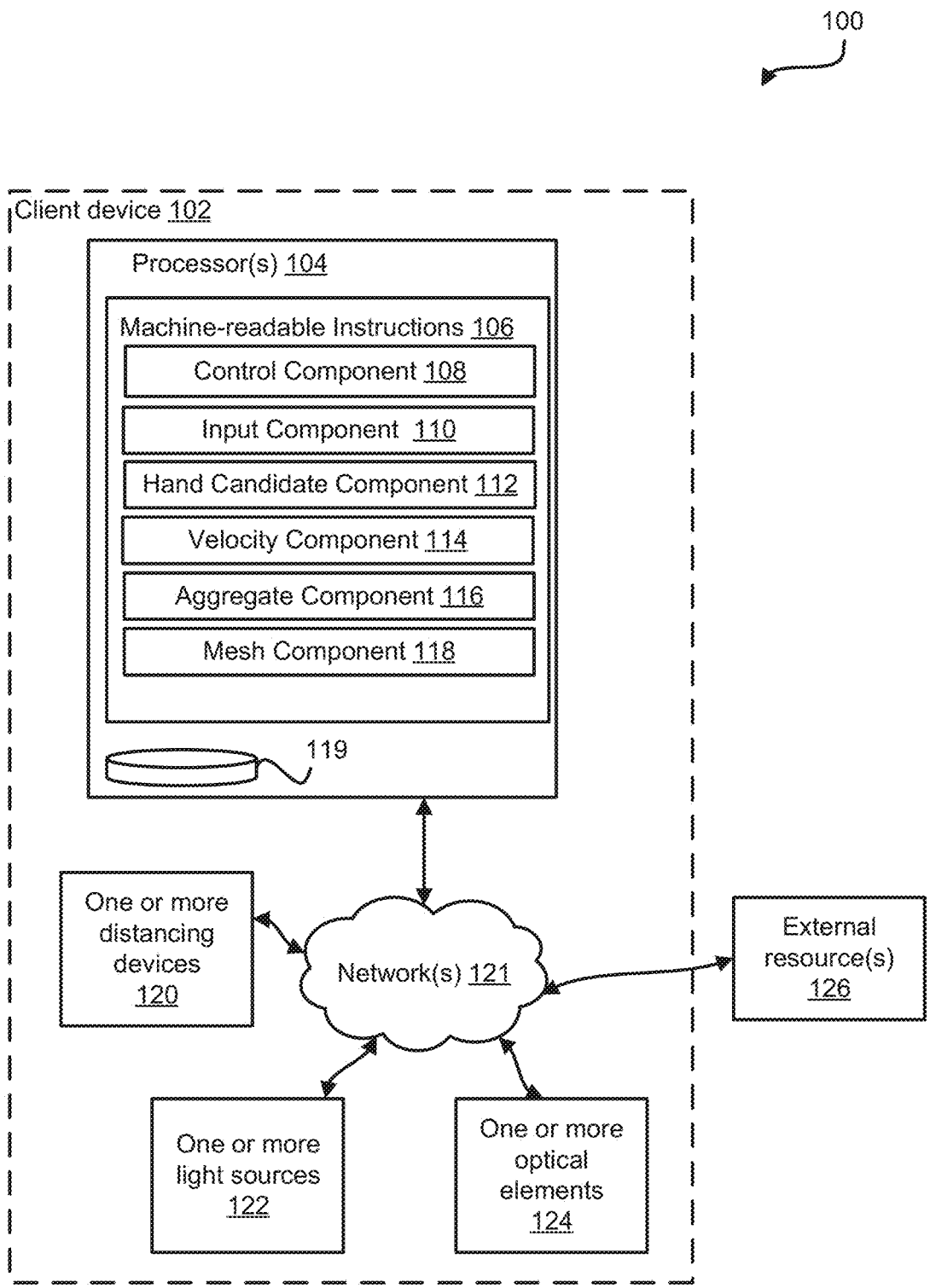
FIG. 1 illustrates a system configured to simulate physical objects occluding virtual objects within an interactive space, in accordance with one or more implementations.

FIG. 1 shows a system 100 configured to simulate physical objects occluding virtual objects within an interactive space. The interactive space may include one or more of a virtual reality environment, an augmented reality environment, and/or other interactive spaces. An "augmented reality environment," as used herein, may refer to a space that represents a virtual environment that may be superimposed over a perspective of a physical real-world environment around a user. An augmented reality environment may include attributes of a virtual environment, including virtual objects superimposed over portions of the physical environment. A virtual reality environment may refer to a space that includes the virtual environment. The terms "space" and "environment" may be used interchangeably herein.

The human perceptual system can combine various sensory cues in an efficient manner in order to perceive "physically plausible" virtual content in a real-world environment. For example, the human perceptual system can integrate, among other things, sensory cues such as one or more of luminance, depth, and/or shape information to form and/or perceive coherent virtual content. As a result, the properties of the human perception may be exploited through visual systems, as described herein, employing hardware and/or software architectures to form virtual content (e.g., digital images) that may be located and/or perceived to be located in the real-world environment by virtue of neuroscience principles.

In some implementations, user participation in an interactive space may include utilization of one or more user objects within the interactive space. A user object may include a physical object. The user object may include one or more of a human hand, a hand-held tool or apparatus, and/or other objects. The interactive space may be configured such that the user may perceive virtual objects as being present in the real world. The user object may be moved throughout the interactive space. In some implementations, a virtual object may be perceived to be at a range from the user that may exceed a range of the user object from the user. In the event that the user object is positioned between the virtual object and the user, the user object may be presented by a client device to the user as occluding at least part of the virtual object. In order to provide a realistic experience to the user, the occlusion of the virtual object by the user object must be accurately determined and reflected in the perception of the virtual object by the user.

The system 100 may include one or more of a client device 102, one or more physical processors 104 (also referred to herein as "one or more processors" and/or "processor(s)"), one or more distancing devices 120, one or more light sources 122, one or more optical elements 124, electronic storage 119, and/or other components. A set of components comprising at least one light source and at least one optical element may be referred to herein as an "image-forming component." An image-forming component may be configured to emit light rays, via a light source, forming images of virtual content. When client device 102 is worn on the head of the user, the light rays may be provided, via an optical element, to an eye of the user. The images formed by the light rays may be superimposed over views of the real world to create an interactive space.

In some implementations, one or more components of client device 102 may be incorporated into client device 102. By way of non-limiting illustration, client device 102 may include and/or otherwise hold one or more of one or more physical processors 104, one or more distancing devices 120, one or more light sources 122, one or more optical elements 124, and/or other components. The client device 102 may be configured to be worn on a head of a user. By way of non-limiting illustration, client device 102 may include a headset. The headset may include one or more of a head-mounted display (HMD), glasses, goggles, and/or other devices.

In some implementations, one or more components of system 100 may be included in one or more devices external to client device 102. For example, one or more components may be included in one or more of a desktop computer, a laptop computer, other mobile computer configurations, and/or other computing devices. By way of non-limiting illustration, one or more physical processors 104, one or more distancing devices 120, and/or other components may be included in a mobile computing device external to client device 102 (not shown in FIG. 1). The client device 102 may be tethered and/or otherwise connected to the one or more external devices. Such connection may be wired (e.g., USB, HDMI, and/or other wired connection), and/or wireless (e.g., Bluetooth, Wi-Fi, and/or other wireless connection).

In some implementations, individual light sources of one or more light sources 122 may be configured to emit light forming images of virtual content. An individual light source may comprise one or more of a microelectromechanical systems (MEMS) RGB laser scanner, a microLED microdisplay, an LED illuminated liquid crystal on silicon (LCOS) microdisplay, an RGB laser LCOS microdisplay, a digital light projector (DLP), a digital micromirror device (DMD), a liquid crystal display (LCD), an organic light-emitting diode (OLED) display, an OLED microdisplay, and/or other light sources. An individual light source may comprise an array of addressable optical components. Individual optical components may be individually controllable to impact one or more aspects of light to create digital images. By way of non-limiting illustration, individual optical components of a display may be individually controllable to impact one or more of transmissivity, brightness, generation, reflection, refraction, and/or other aspects of light to create images.

In some implementations, one or more light sources 122 may be positioned relative to one or more optical elements 124, such that light emitted from one or more light sources 122 may be received by one or more optical elements 124. In some implementations, control of position and/or light generation of individual light sources 122 may impact one or more aspects of a perceived three-dimensional light field and/or virtual content within the three-dimensional light field. One or more aspects of virtual content within a three-dimensional light field may include one or more of a perceived range of the virtual content from a user, a perceived depth of the virtual content, a perceived size of the virtual content, and/or other aspects of the virtual content.

In some implementations, one or more optical elements 124 may form at least part of a portion of client device 102 through which a user may view the real world. Individual optical elements of one or more optical elements 124 may be configured to provide the light emitted from the light source to an eye of the user to generate an interactive space. In some implementations, one or more image-forming components may be configured to present images individually to each eye of the user as stereo image pairs. In this configuration, client device 102 may include a first set of image-forming components for one eye and a second set of image-forming components for another eye.

In some implementations, individual optical elements of one or more optical elements 124 may comprise one or more reflective and/or partially reflective surfaces. An optical element may be formed from a reflective and/or partially reflective material. A reflective and/or partially reflective material may comprise one or more ZEONEX, Cyclo Olefin Polymer (COP), Cyclic Olefin Copolymer (COC), polycarbonate, Poly (methyl methacrylate) (PMMA), and/or other materials.

In some implementations, individual optical elements of one or more optical elements 124 may be arranged on client device 102 such that, when client device 102 is worn on the head of a user, the user's gaze may be directed toward one or more optical elements 124. In some implementations, one or more optical elements 124 may be arranged on client device 102 such that, when client device 102 is worn on the head of the user, light rays generated by one or more light sources 122 may be directed onto one or more optical elements 124 to form images of virtual content on one or more optical elements 124. The images of virtual content formed on one or more optical elements 124 may be superimposed over the user's view of the real world through one or more optical elements 124 to create an interactive space. It is noted that the use of the term "light ray" is not intended to limit the scope of the disclosure to single, discrete, photons and/or packets of photons. Instead, the disclosure may envision a light ray to mean a light beam comprising multiple and continuous photons, in one or more implementations.

In some implementations, one or more optical elements 124 may be arranged on client device 102 such that light rays generated by one or more light sources 122 may be directed at one or more optical elements 124, coupled into one or more optical elements 124, and directed out of one or more optical elements 124 into an eye of a user. The images of virtual content may be projected onto a retina of the eye such that the images may be superimposed over the user's view of the real world.

In some implementations, individual optical elements of one or more optical elements 124 may comprise a waveguide and/or other components. A waveguide may include one or more of a layered waveguide, a planar partial mirror array waveguide, a diffractive waveguide, a diffractive waveguide including Bragg gratings, a free form surface prism, and/or other waveguides. In some implementations, a waveguide may include and/or may be coupled with optical coupling features configured to couple light rays into the waveguide. Light rays coupled into a waveguide may be propagated through the waveguide and directed out of the waveguide toward one or more eyes of a user.

Figure 3:
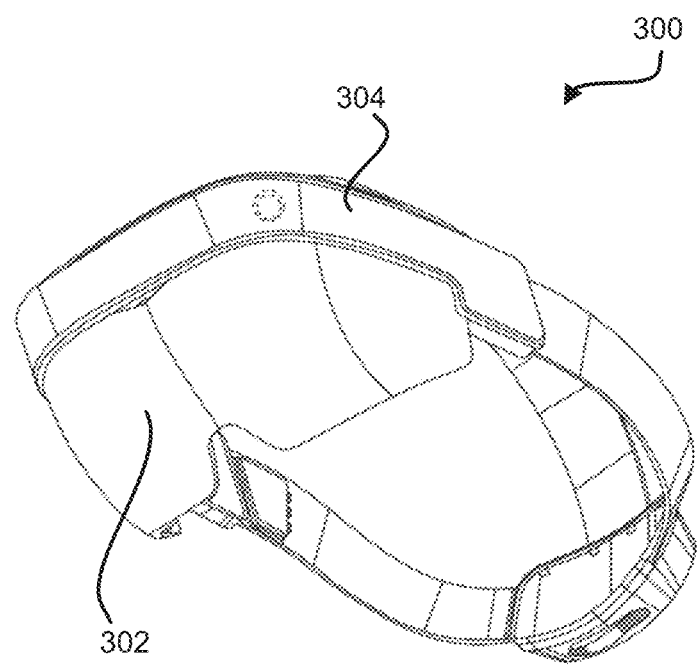
FIG. 3 illustrates an exemplary client device.

Referring now to FIG. 3, in some implementations, a client device (e.g., client device 102 in FIG. 1) may comprise an HMD 300 and/or other headset. One or more components of system 100 (FIG. 1) may be held by and/or comprise part of HMD 300. By way of non-limiting illustration, an optical element of an image-forming component may comprise at least part of a visor portion 302 of HMD 300. Components such as one or more of physical processors, light sources of image-forming components, one or more distancing devices, and/or other components may be incorporated into a housing portion 304 and/or other portions of HMD 300.

Figure 4:
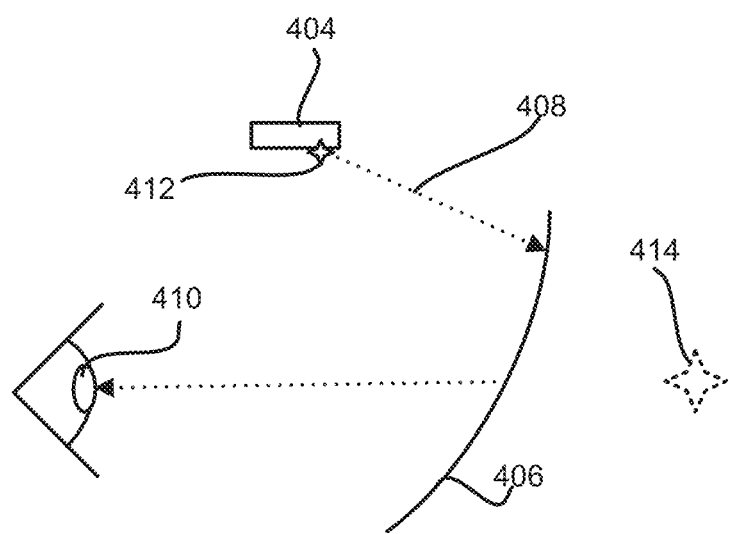
FIG. 4 illustrates an exemplary image-forming component.

FIG. 4 illustrates a configuration of a light source 404 and an optical element 406 of an image-forming component, in accordance with one or more implementations. The optical element 406 may comprise, and/or may be part of, a visor portion of a headset. The light source 404 may be configured to emit light rays, including light ray 408. The light rays may form images, including image 412. The light rays may be received by optical element 406 and provided to an eye 410 of a user. The light rays received by eye 410 may form virtual content 414 (e.g., a virtual object) perceived to lie within three-dimensional space in the user's vision field or portion thereof.

Returning to FIG. 1, individual distancing devices of one or more distancing devices 120 may be configured to generate output signals conveying position information and/or other information. Position information may include depths, distances, and/or positions of one or more surfaces of one or more real-world objects within a real-world environment. The one or more real-world objects may include a user object. The user object may include a physical object. The user object may include one or more of a human hand, a physical tool held or controlled by a user, and/or other objects. The one or more distancing devices 120 may include one or more of a camera, a three-dimensional scanner, a depth sensor, a rangefinder, a laser gauge, a time-of-flight sensor, a volumetric imaging sensor, an IR camera/emitter pair, a passive structured light stereo pair, a passive unstructured light stereo pair, and/or other devices.

Figure 5:
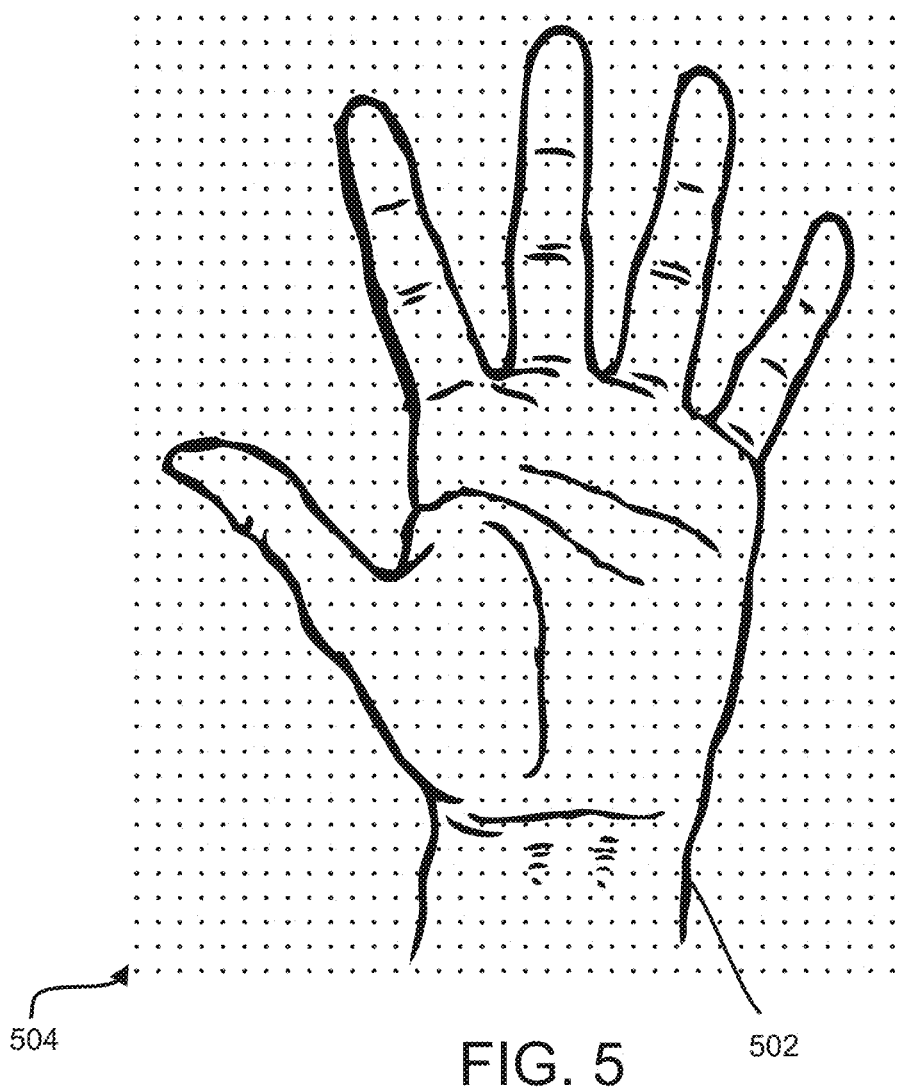
FIG. 5 illustrates points on a surface of a real-world object, the points representing positions of the surface of the real-world object.

In some implementations, individual distancing devices of one or more distancing devices 120 may be configured to generate output signals such that the position information may be organized in a two-dimensional grid, e.g., a regular grid. In some implementations, the position information may form a regular grid of points for which position information has been captured and/or generated. By way of non-limiting example, FIG. 5 illustrates a grid 504 of points for which position information has been captured and/or generated. As illustrated in FIG. 5, grid 504 may be regular in both horizontal and vertical directions and/or have other patterns. The other patterns may include hexagonal lattice and/or other patterns. For a flat surface, neighboring points along a particular horizontal scanline or capture-line may be spaced apart by equal distances for surfaces at the same distance to the distancing device. The neighboring points along a particular vertical scanline or capture-line may be spaced apart by equal distances for surfaces at the same distance to the distancing device.

Figure 6:
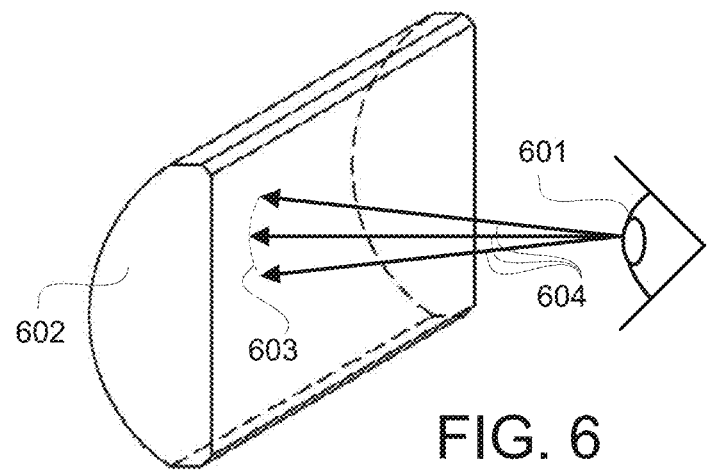
FIG. 6 illustrates an example of a concave cylindrical surface as may be used by a distancing device when capturing output signals that convey position information organized in a grid.

In some implementations, the position information may form a regular grid of points when projected on a concave spherical surface for which parts of the surface may have the same distance to a point of origin of the distancing device (e.g., the center of the lens of a distancing device). In some implementations, the position information may form a regular grid of points when projected on a concave cylindrical surface for which parts of either a horizontal or vertical scanline or capture-line of the surface may have the same distance to a point of origin of the distancing device (e.g., the center of the lens of a distancing device), but where the vertical or horizontal scanline or capture-line is a straight line, respectively. By way of non-limiting example, FIG. 6 illustrates a concave cylindrical surface 602 as viewed by an eye 601 of an observer. The concave cylindrical surface 602 may be arranged such that parts of a vertical scanline 603 (or line-of-sight of a user when the user views in directions 604, i.e. up and down) have the same distance to eye 601, and the horizontal scanline (or line-of-sight of a user) is a straight line.

In some implementations, a position of a surface may be expressed as one or more of distance from an individual distancing device, an angle from reference line (e.g., a horizontal line), a three-dimensional spatial coordinate in a coordinate system, and/or other information. For example, in a three-dimensional Cartesian coordinate system, a spatial coordinate may be expressed as individual values of one or more of an x-component, y-component, z-component, and/or other components.

In some implementations, position information may comprise point cloud information. Point cloud information may include positions of points in individual sets of points, referred to as "point clouds." In some implementations, individual points in a point cloud may have real-world spatial coordinates corresponding to individual positions of individual surfaces in the real-world. A set of points may correspond to positions of a set of surfaces within a range of vision of a distancing device. Individual points may be associated with individual time stamps. An individual time stamp may correspond to an individual point in time when an individual position of an individual surface may have been measured. The time stamps may be based on a sampling rate of the distancing device. It is noted that one or more references to "a surface" or "surfaces" may refer to "a point" or "points," respectively, within a point cloud that lie on the surfaces and convey position of the surfaces in the real-world. In some implementations, a set of surfaces and/or a set of points may form a contiguous surface. In some implementations, a set of surfaces and/or a set of points may make up a contiguous object.

In FIG. 1, one or more physical processors 104 may be configured by machine-readable instructions 106. Executing machine-readable instructions 106 may cause one or more physical processors 104 to facilitate simulating physical objects occluding virtual objects within an interactive space. The machine-readable instructions 106 may include one or more of a control component 108, an input component 110, a hand candidate component 112, a velocity component 114, an aggregate component 116, a mesh component 118, and/or other components.

In some implementations, control component 108 may be configured to control one or more components of system 100. In some implementations, control component 108 may be configured to control individual distancing devices of one or more distancing devices 120, and/or other components. In some implementations, control of individual distancing devices may include control of one or more of a sampling rate at which individual distancing devices generate output signals, a sampling period in which individual distancing devices generate output signals, a resolution and/or granularity of individual distancing devices, a horizontal and/or vertical width of the angle of capture and/or generation of position information by individual distancing devices, and/or other control of individual distancing devices of one or more distancing devices 120.

In some implementations, control component 108 may be configured to control individual light sources of one or more light sources 122, and/or other components. In some implementations, control of individual light sources may include one or more of control of light emission in accordance with one or more instances of virtual content to be generated and/or presented in an interactive space, and/or other types of control. By way of non-limiting illustration, control component 108 may be configured to control one or more light sources 122 to generate an image forming a virtual object. The virtual object may be perceived at a position in the real-world. The position may include a range from the user and/or client device 102.

The input component 110 may be configured to obtain position information and/or other information. Position information may be derived from output signals of individual distancing devices of one or more distancing devices 120, from electronic storage 119, from remote storage, and/or from other sources. In some implementations, position information may be obtained at a sampling rate of individual distancing devices of one or more distancing devices 120. The position information may include one or more of positions, depths, and/or distances of a set of points that lie on surfaces of one or more real-world objects. For example, the positions may be on or near surfaces of a real-world object, including but not limited to a user's hands. In some implementations, position information may be three-dimensional positional information.

In some implementations, hand candidate component 112 may be configured to identify a group of points comprising a subset of a point cloud. The group of points may lie on a candidate surface which may be a candidate for being a surface of a user object, such as a hand. The hand candidate component 112 may be configured to determine groups of points based on one or more of proximity in range of points included in the group, and/or based on other characteristics. Groups of points may include points and/or surfaces that may make up individual contiguous objects.

The hand candidate component 112 may be configured to associate individual groups of points with an individual user object. The hand candidate component 112 may be configured to associate an identified group of points with a given user object based on one or more of similarity in size and/or shape of the group of points with a size and/or shape of the user object, similarity to predetermined patterns and/or templates of user object, similarity and/or range of colors, and/or other characteristics. For example, hand candidate component 112 may be configured to associate an identified group of points with the presence of a user object, such as a hand.

By way of non-limiting illustration, referring back to FIG. 5, a group of points comprising a subset of points in grid 504 may be identified as a candidate for a user hand 502. For example, the group of points may be identified based on the subset of points being at the same or similar range, and/or within a threshold of a given range. The group of points may comprise the points lying within the solid-line outline of hand 502. The group of points may be associated with a hand based on the group of points having similarity with a known size and/or shape of a human hand, a relative spatial arrangement specific to the hand, and/or other characteristics. For example, a relative spatial arrangement of the points in the 3D space may exhibit characteristics of fingers and a palm.

Returning to FIG. 1, hand candidate component 112 may be configured to determine, based on the position information and/or other information, position of user objects over time. The position may be specified with respect to an origin at a location of a distancing device, a predetermined reference origin, and/or specified in other way. In some implementations, a position of a user object may be determined based on positions specified for individual points included in a group of points associated with the user object. By way of non-limiting illustration, the position of the user object may refer to one or more of a position of a center point in the group of a points, a position of a representative point (e.g., a center, an edge, a corner, etc.), the positions of multiple points determined to lie on a perimeter edge of the group of points, an average position of the positions of the points in a group of points, and/or other information. In some implementations, a perimeter edge may be determined where points having a depth (e.g., z-component) that drops off dramatically compared to neighboring points.

The velocity component 114 may be configured to determine, based on the position information and/or other information, an estimated velocity of the user object in or through the interactive space. By way of non-limiting illustration, velocity component 114 may be configured to determine estimated velocity of the user object based on calculating a change in position over unit time. The change in position may return a distance value. The distance value may be determined from a three-dimensional representation of the position of the user object (e.g., a three-dimensional distance) and/or a two-dimensional representation of the position of the user object (e.g., a two-dimensional distance).

Figure 8:
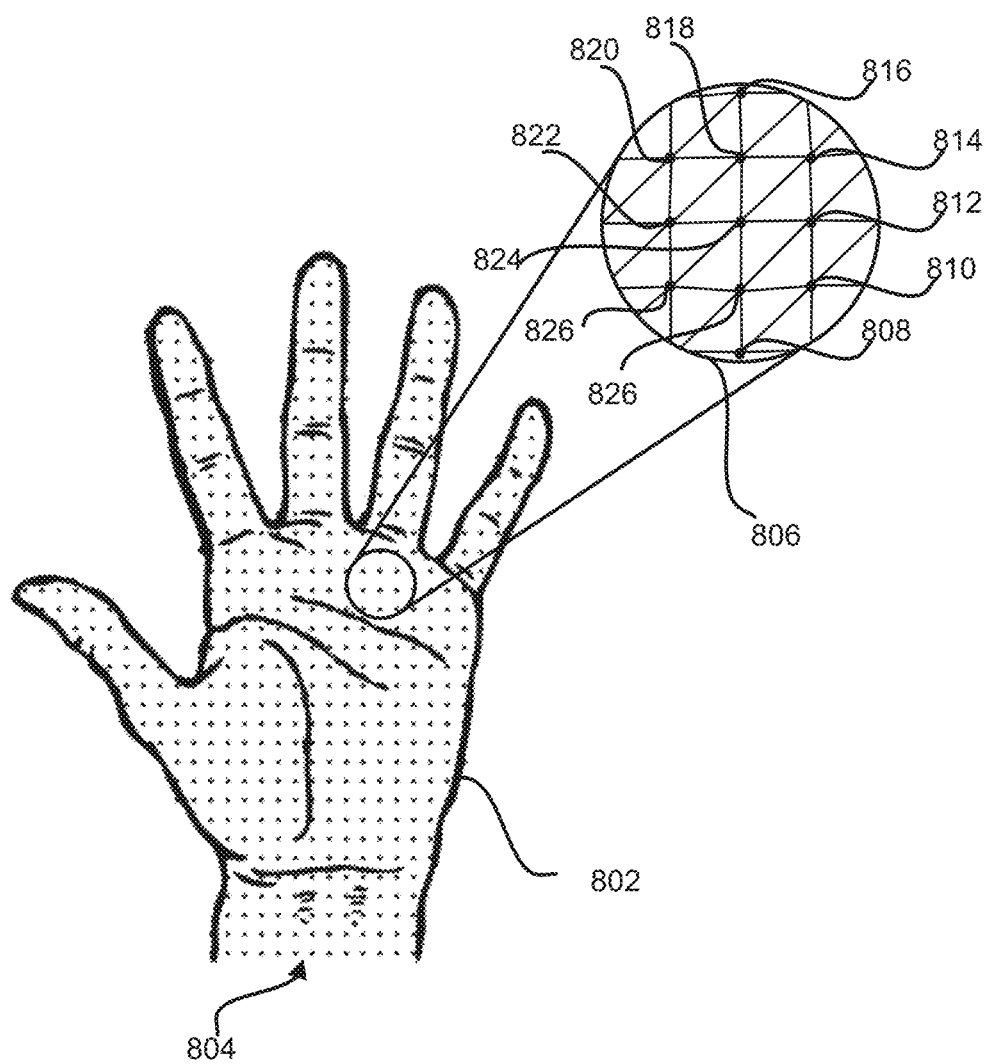
FIG. 8 illustrates a real-world object and a mesh (see inset) generated based on the points representing positions of a surface of the real-world object.

The aggregate component 116 may be configured to obtain, from the position information and/or other information, point cloud images. In some implementations, an individual point cloud image may depict a two-dimensional representation of a point cloud. In some implementations, an individual point cloud image may depict a two-dimensional representation of a group of points associated with a user object. For example, the individual point cloud image may be obtained by forming a grid of points from a point cloud (or subset of the point cloud) by projecting the point cloud (or subset of the point cloud) on a concave spherical surface and/or other surface. The point cloud images may be obtained at points in time corresponding to a sampling rate of one or more distancing devices 120 and/or at other points in time. By way of non-limiting illustration, a given point cloud image may represent a "snapshot" of the point cloud (or subset of the point cloud) at a given point in time. By way of non-limiting illustration, FIG. 8 shows a visual representation of a group of points 804 arranged in a grid. The group of points may be associated with a user object 802.

Returning to FIG. 1, aggregate component 116 may be configured to generate aggregate point cloud images over time. The aggregate point cloud images may comprise aggregates of multiple point cloud images. An aggregate of point cloud images may be generated by aggregating the positions of points depicted in multiple point cloud images. The aggregate may include one or more of an average of positions, a weighted average of positions, and/or other aggregations.

In some implementations, aggregate component 116 may be configured such that, at a given point in time, a current point cloud image may be aggregated with one or more previous aggregate point cloud images to generate a current aggregate point cloud image. The current point cloud image may be derived from output signals of one or more distancing devices 120 sampled at the given point in time. The one or more pervious aggregate point cloud images may refer to aggregate point cloud images generated from output signals sampled at one or more points in time prior to the given point in time. At an initialization of the system 100, a first iteration of generating aggregate point cloud images may be performed by aggregating a first point cloud image (e.g., sampled at time zero) with one or more subsequent point cloud images.

In some implementations, aggregate component 116 may be configured such that generating a current aggregate point cloud image comprises assigning weights to the current point cloud image and the one or more previous aggregate point cloud images. In some implementations, the weights may be constant. By way of non-limiting illustration, a weight for the one or more previous aggregate point cloud images may be set to a value of λ. A weight for the current point cloud image may be set to a value of 1-λ. In some implementations, A may be set to a value between zero and one, and/or other range. In some implementations, A may be set to a value between 0.7 and 0.9 and/or other range. In some implementations, A may be set to a value of 0.8 and/or other values.

In some implementations, the weights may be dynamically varied (e.g., by varying A) based on an estimated velocity of a user object. By way of non-limiting illustration, the weight for the current point cloud image may be increased and the weight for the one or more previous aggregate point cloud images may be decreased as the estimated velocity increases. This may be accomplished by reducing the value of A. In some implementations, the weight for the current point cloud image may be decreased and the weight for the one or more previous aggregate point cloud images may be increased as the estimated velocity decreases. This may be accomplished by increasing the value of A. In some implementations, the varying of the weights may be carried out by a shifted sigmoid function and/or other techniques.

Figure 7:
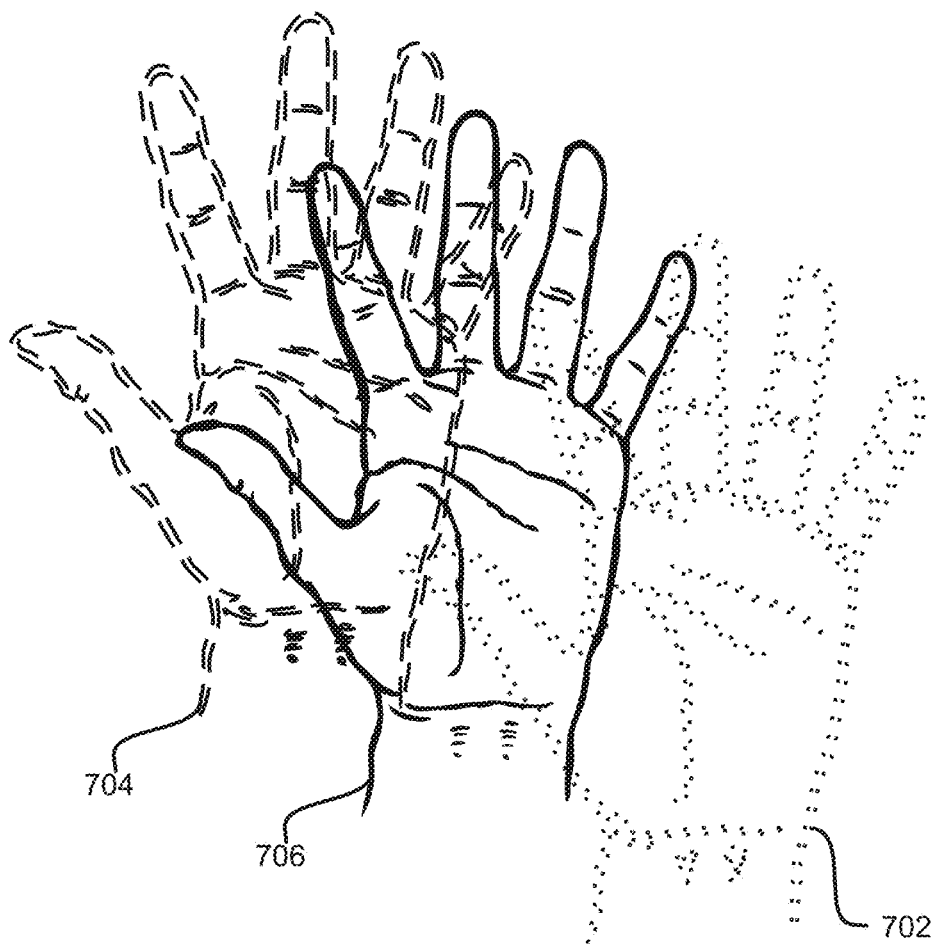
FIG. 7 is a graphic showing a current point cloud image (dashed line) aggregated with a previous aggregate point cloud image (dotted line) to generate a current aggregate point cloud image (solid line).

FIG. 7 is a graphic showing a current point cloud image 704 (dashed line) of a user object (e.g., a hand) aggregated with a previous aggregate point cloud image 702 (dotted line) to generate a current aggregate point cloud image 706 (solid line). It is noted that the groups of points that normally represent the user object have been omitted for clarity. Instead, only the outlines of the user object are shown.

Returning to FIG. 1, mesh component 118 may be configured to generate a mesh based on current aggregate point cloud images. The mesh may include a set of vertices and/or other components. In some implementations, generating the mesh may comprise assigning individual vertices of the mesh to individual points represented in a current aggregate point cloud image. The mesh, when implemented to facilitate occlusion of virtual objects by physical objects, may be conform to the contours of the detected user object by setting a depth component (e.g., z-component) of the vertices to match the depth component of the individual points. In this manner, the mesh may act as a texture, or skin, sitting over a group of points that are representative of a user object. In some implementations, a resolution of the mesh (e.g., a quantity of vertices per unit area) may be the same as or similar to the resolution of the aggregate point cloud images (e.g., a quantity of points per unit area).

In some implementations, assigning vertices of the mesh to individual points may include filtering a group of points that are representative of a user object to identify candidate points suitable for use in the mesh. In some implementations, the filtering may include a spatial denoising step which removes (e.g., filters out) points that may be outliers. The filtering out may be performed using a truncated bilateral filter, and/or other technique. A vertex may be assigned to a point in a current aggregate point cloud. A neighborhood of the vertex may be analyzed by mesh component 118. The neighborhood may include a one or more of 3×3 points, 5×5 points, 7×7 points, 9×9 points, 11×11 points, and/or other quantities of points surrounding the vertex. The mesh component 118 may compute a weighted average of all the "good" cloud points. The "good" cloud points may be those that have a depth component that is not inconsistent with the depth component of other points. The weights may be taken from a truncated gaussian with variance of 1 and/or other value that may be tunable.

The mesh component 118 may generate the mesh by connecting vertices forming triangle and/or other polygons. The mesh component 118 may be configured to analyze one triangle at a time and throw away triangles that may be either a sliver/spike along the edge and/or falls entirely on "bad"

point cloud areas (e.g., depth component has exceeded what is consistent with other points).

In some implementations, mesh component 118 may be configured such that generating a mesh further comprises smoothing edges of the mesh. The edge of the mesh may include aliasing artifacts, e.g., artifacts creating a staircase effect. The aliasing artifacts may be due to the resolution of the point cloud, which may be exacerbated by noise in the data. The mesh component 118 may be configured to perform a Laplacian smoothing with feature preservation or other techniques to smooth the contour of the mesh. The alpha channel (e.g., transparency component) of the vertices on the edge may be set to gradually fall to 0 (0 being completely transparent, 1 being completely opaque), which may then be raised with an exponent to make it fall non-linearly along the edge.

In some implementations, the mesh may be configured to have an associated texture, with both color and alpha channel. The mesh component 118 may be configured to reduce aliasing artifacts by performing Gaussian or other blur operations on the alpha channel (transparency) of the texture such that the alpha falls off gradually towards the edge of the mesh, which then may be raised with an exponent to make it fall non-linearly along the edge. The color component of the texture maybe be used to highlight the entire mesh or an edge. The mesh may have different colors based on different states of the user object (e.g. hand grabbing, first on/off).

In some implementations, the resolution of the mesh may be varied with adaptive tessellation based on the spatial depth complexity (changes in the depth or the z component in the point cloud within a spatial neighborhood of a given point). Regions with high depth complexity (depth changes rapidly spatially) may have higher resolution compared to regions with lower depth complexity. The depth complexity may be estimated by comparing the minimum and maximum depth values within a local spatial neighborhood. In some implementations, this comparison maybe be done with the inverse of the minimum and inverse of the maximum depth, which may account for the relative parallax, i.e. regions closer to the viewer may enjoy higher mesh resolution compared to region further away with similar depth complexities. In some implementation, this adaptive mesh resolution may be done by leveraging special hardware capabilities (e.g. Tessellation Shader in the Graphics Processing Unit, GPU).

The mesh component 118 and/or other components of machine-readable instructions 106 may be configured to utilize the mesh during implementation of an interactive space including views of one or more virtual objects to facilitate simulating physical objects occluding the virtual objects. For example, the mesh may be overlaid on a group of points that represent surfaces of a user object. The mesh may essentially provide a texture, or skin, over the user object through which to track the position of the user object. When the user object, and therefore mesh, are positioned to occlude one or more virtual objects, the images forming the one or more virtual objects may be modified. The modifications may include removing parts of the virtual objects formed by the images that are to be perceived as being occluded by the user object.

By way of non-limiting illustration, control component 108 may be configured to control one or more image-forming components (e.g., one or more lights sources 122 and/or one or more optical elements 124) to generate an image forming a virtual object. The virtual object may be perceived at a first position in the real world. The hand candidate component 112 may be configured to determine, from position information and/or other information, a second position of a user object in the interactive space. The second position of the user object may correspond to a position of the mesh when the mesh is overlaid on a group of points representing the user object. Accordingly, the mesh may also be at the second position. The mesh component 118 may be configured to determine, based on the first position and the second position, one or more portions of overlap between the mesh and the virtual object. The mesh component 118 may be configured to instruct control component 108 to control one or more image-forming components to modify the image of the virtual object based on the portion(s) of overlap. In some implementations, the modification may include removing one or more parts of the virtual object from the image that correspond to the portion of overlap. This removal may cause the virtual object to be perceived as being occluded by the user object.

FIG. 8 further illustrates a mesh 806 generated based on the group of points 804 representing positions of the surface of user object 802. The mesh 806 may be generated by connecting vertices, including vertices 808-828. It is noted that mesh 806 is shown as a partial mesh emphasized by the inset in FIG. 8 for clarity only. In practice, a mesh may be generated that may encompass a majority or entirety of the surface of user object 802.

Figure 9:
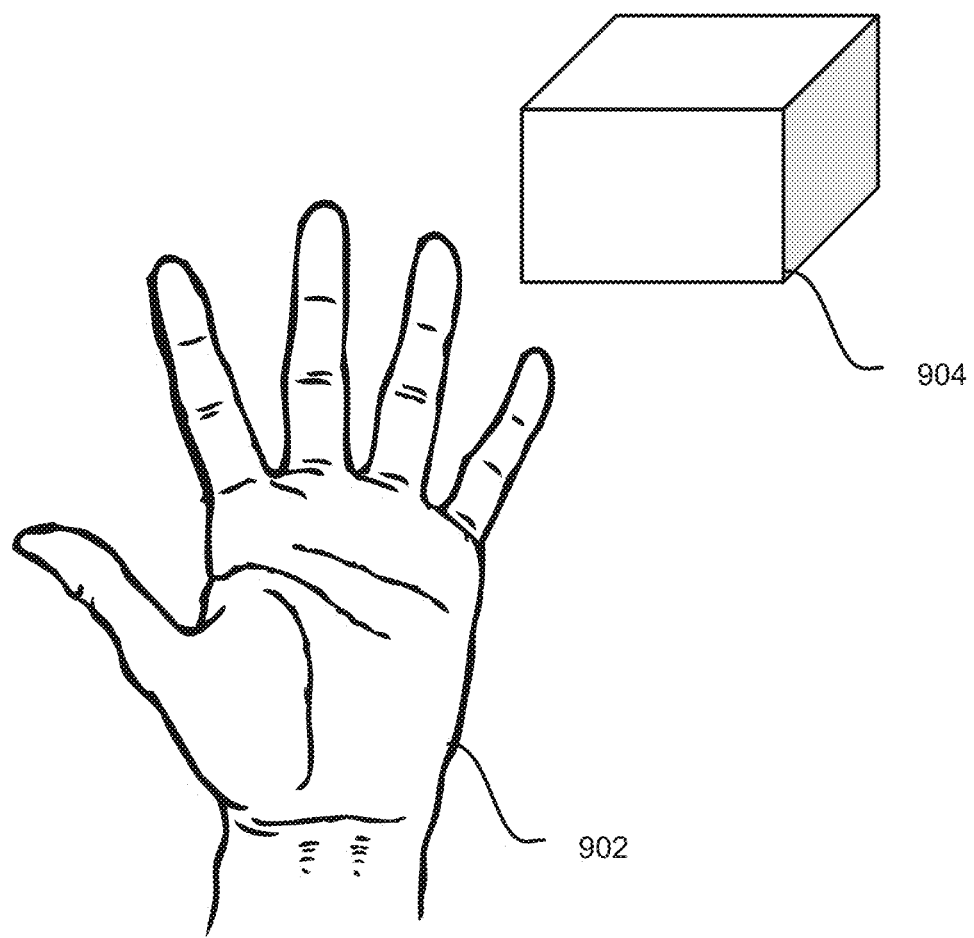
FIG. 9 illustrates a view of an interactive space showing a real-world object and a virtual object.
Figure 10:
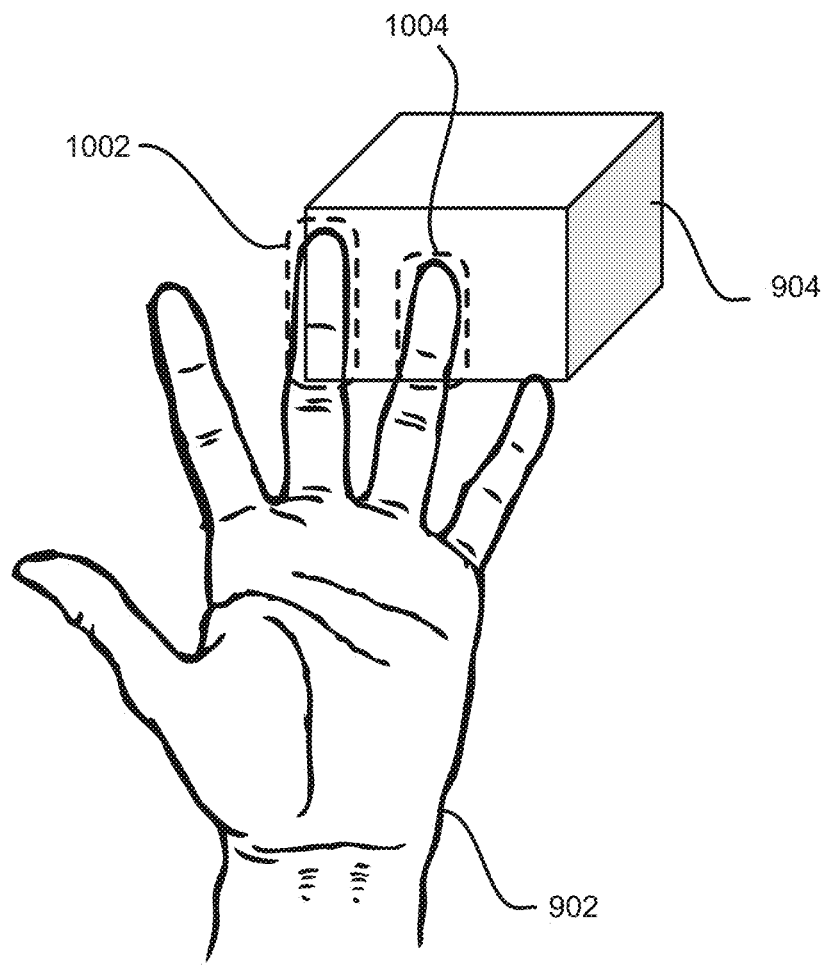
FIG. 10 illustrates a view of an interactive space showing a real-world object and a virtual object and an improper occlusion of the virtual object by the real-world object.
Figure 11:
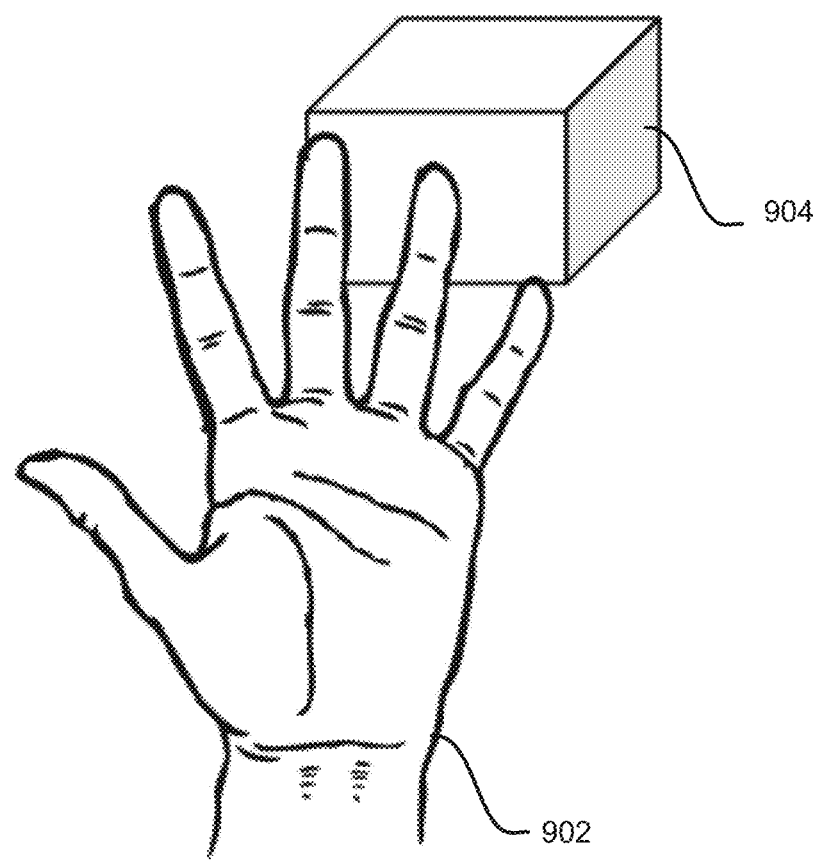
FIG. 11 illustrates a view of an interactive space showing a real-world object and a virtual object and an occlusion of the virtual object by the real-world object based on one or more implementations of the systems and methods presented herein.

FIGS. 9-11 illustrate utilization of a mesh generated in accordance with one or more implementations of system 100 (FIG. 1) described herein. In particular, FIG. 9 illustrates a view of an interactive space showing a real-world object 902 and a virtual object 904. The real-world object 902 may comprise a user object, such as a hand. FIG. 9 currently shows the real-world object 902 in a position that does not occlude virtual object 904.

FIG. 10 illustrates a view of the interactive space showing real-world object 902 and virtual object 904 where real-world object 902 is in a position to occlude at least part of virtual object 904. Currently shown in FIG. 10 is an improper occlusion of virtual object 904 by the real-world object 902 because portions of overlap 1002 and 1004 currently show both real-world object 902 and virtual object 904. However, once the portions of overlap are identified, the image forming virtual object 904 may be modified to cause the perception of occlusion.

FIG. 11 illustrates a view of the interactive space showing real-world object 902 and virtual object 904 and a proper occlusion of virtual object 904 by real-world object 902. In particular, the portions of overlap identified in FIG. 10 may be used to modify the image forming virtual object 904 such that portions of virtual object 904 corresponding to the portions of overlap may be removed from the image.

Returning to FIG. 1, processor(s) 104, one or more distancing device 120, one or more light sources 122, one or more optical elements 124, external resource(s) 126, and/or other components of system 100 may be operatively linked via one or more electronic communication links. For example, such electronic communication links may be established, at least in part, via network(s) 121. Network(s) 121 may comprise one or both of wired (e.g., USB, HDMI, and/or other connections) and/or wireless communications (e.g., Bluetooth, Wi-Fi, and/or other connections). It will be appreciated that this is not intended to be limiting and that the scope of this disclosure includes implementations in which processor(s) 104, one or more distancing device 120, one or more light sources 122, one or more optical elements 124, external resource(s) 126, and/or other components of system 100 may be operatively linked via some other communication media.

The external resource(s) 126 may include sources of information, hosts, external entities participating with system 100, providers of virtual content, and/or other resources. In some implementations, some or all of the functionality attributed herein to external resource(s) 126 may be provided by resources included in system 100.

Processor(s) 104 may include and/or have access to electronic storage 119, and/or other components. Processor(s) 104 may include communication lines or ports to enable the exchange of information with a network, electronic storage 119, and/or other components of system 100. Illustration of processor(s) 104 in FIG. 1 is not intended to be limiting. Processor(s) 104 may include a plurality of hardware, software, and/or firmware components operating together to provide the functionality attributed herein to processor(s) 104. For example, processor(s) 104 may be implemented by a cloud of computing platforms operating together as processor(s) 104.

Electronic storage 119 may comprise electronic storage media that electronically stores information. The electronic storage media of electronic storage 119 may include one or both of system storage that is provided integrally (i.e., substantially non-removable) with processor(s) 104 and/or removable storage that is removably connectable to processor(s) 104 via, for example, a port or a drive. A port may include a USB port, a firewire port, and/or other port. A drive may include a disk drive and/or other drive. Electronic storage 119 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 119 may include one or more virtual storage resources (e.g., cloud storage, a virtual private network, and/or other virtual storage resources). Electronic storage 119 may store software algorithms, information determined by processor(s) 104, information received from other components of system 100, and/or other information that enables processor(s) 104 to function as described herein.

Processor(s) 104 is configured to provide information-processing capabilities. As such, processor(s) 104 may include one or more of a digital processor, an analog processor, a digital circuit designed to process information, an analog circuit designed to process information, a state machine, and/or other mechanisms for electronically processing information. Although processor(s) 104 is shown in FIG. 1 as a single entity, this is for illustrative purposes only. In some implementations, processor(s) 104 may include one or more processing units. These processing units may be physically located within the same device, or processor(s) 104 may represent processing functionality of a plurality of devices operating in coordination. Processor(s) 104 may be configured to execute components 108, 110, 112, 114, 116, and/or 118. Processor(s) 104 may be configured to execute components 108, 110, 112, 114, 116, and/or 118 by software; hardware; firmware; some combination of software, hardware, and/or firmware; and/or other mechanisms for configuring processing capabilities on processor(s) 104.

It should be appreciated that although components 108, 110, 112, 114, 116, and/or 118 are illustrated in FIG. 1 as being co-located within a single processing unit, in implementations in which processor(s) 104 includes multiple processing units, one or more of components 108, 110, 112, 114, 116, and/or 118 may be located remotely from the other components. The description of the functionality provided by the different components 108, 110, 112, 114, 116, and/or 118 described above is for illustrative purposes and is not intended to be limiting, as any of components 108, 110, 112, 114, 116, and/or 118 may provide more or less functionality than is described. For example, one or more of components 108, 110, 112, 114, 116, and/or 118 may be eliminated, and some or all of its functionality may be provided by other ones of components 108, 110, 112, 114, 116, 118, and/or other components. As another example, processor(s) 104 may be configured to execute one or more additional components that may perform some or all of the functionality attributed to one of components 108, 110, 112, 114, 116, and/or 118.

Figure 2:
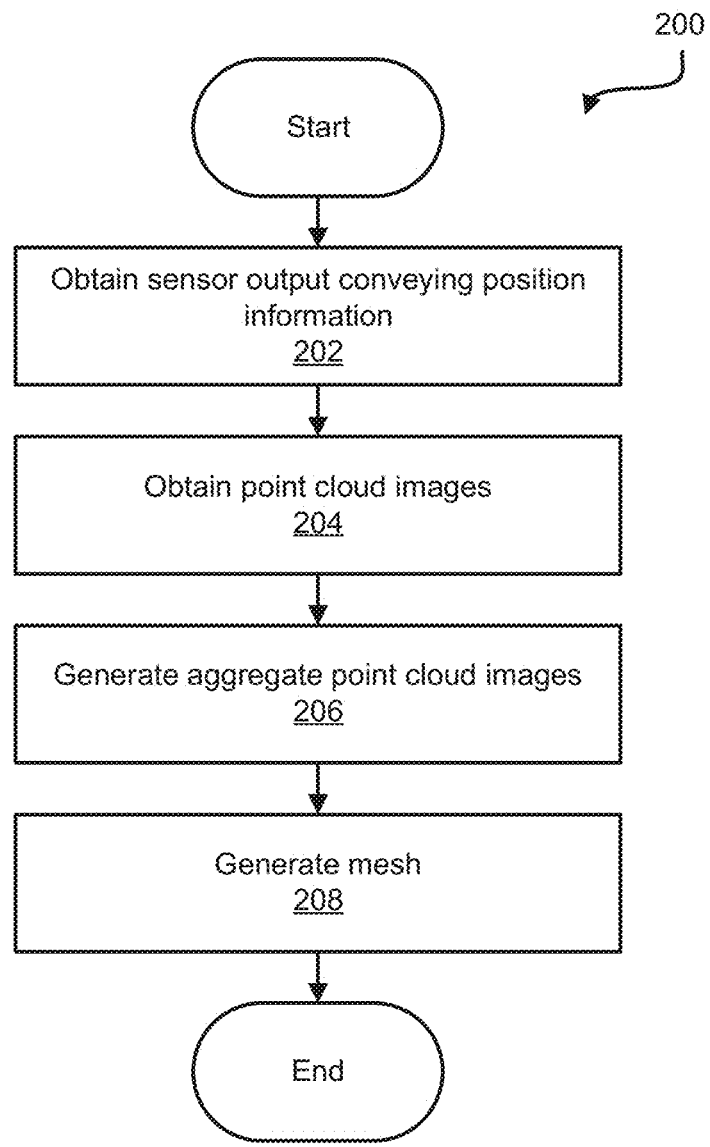
FIG. 2 illustrates a method to simulate physical objects occluding virtual objects within an interactive space, in accordance with one or more implementations.

FIG. 2 illustrates a method 200 of identifying and tracking a human hand in an augmented or virtual reality environment, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in a computer system comprising one or more of non-transitory electronic storage storing machine-readable instructions, one or more processing devices (e.g., a physical processor, a digital processor, an analog processor, a digital circuit designed to process information, an analog circuit designed to process information, a state machine, and/or other mechanisms for electronically processing information), one or more light sources, one or more optical elements, one or more distancing devices, one or more optical elements, and/or other components. The one or more processing devices may include one or more devices executing some or all of the operations of method 200 in response to instructions stored electronically on electronic storage media. The one or more processing devices may include one or more devices configured through hardware, firmware, and/or software to be specifically designed for execution of one or more of the operations of method 200.

At an operation 202, output signals from a distancing device may be obtained. The output signals may convey position information and/or other information. The position information may include three-dimensional positions of surfaces of real-world objects. The real-world objects may include a user object. The position information may define a point cloud. The point cloud may include a set of points that lie on the surfaces of the user object. The position information may specify individual three-dimensional positions of individual points in the set of points such that the individual three-dimensional positions of the individual points are on or near the surfaces of the user object. In some implementations, operation 202 may be performed by one or more physical processors executing an input component the same as or similar to input component 110 (shown in FIG. 1 and described herein).

At an operation 204, point cloud images may be obtained from the sensor output and/or position information. An individual point cloud image may depict a two-dimensional representation of the point cloud. In some implementations, operation 204 may be performed by one or more physical processors executing an aggregate component the same as or similar to aggregate component 116 (shown in FIG. 1 and described herein).

At an operation 206, aggregate point cloud images may be generated over time. A current point cloud image may be aggregated with one or more previous aggregate point cloud images to generate a current aggregate point cloud image. In some implementations, operation 206 may be performed by one or more physical processors executing an aggregate component the same as or similar to aggregate component 116 (shown in FIG. 1 and described herein).

At an operation 208, a mesh may be generated based on the aggregate point cloud images. The mesh may include a set of vertices and/or other components. The mesh may be generated by assigning individual vertices of the mesh to individual points represented in a current aggregate point cloud image. In some implementations, operation 208 may be performed by one or more physical processors executing a mesh component the same as or similar to mesh component 118 (shown in FIG. 1 and described herein).

Although the disclosed technology has been described in detail for the purpose of illustration based on what is currently considered to be the most practical and preferred implementations, it is to be understood that such detail is solely for that purpose and that the disclosure is not limited to any particular implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system configured to simulate physical objects occluding virtual objects within an interactive space, the system comprising:
    a distancing device configured to generate output signals conveying three-dimensional positions of surfaces of real-world objects, the real-world objects including a user object, wherein the three-dimensional positions are conveyed in a point cloud, the point cloud including a set of points that lie on the surfaces of the user object; and
    one or more physical processors configured by machine-readable instructions to:
        obtain, from the output signals, point cloud images, an individual point cloud image depicting a two-dimensional representation of the point cloud;
        generate aggregate point cloud images over time, such that a current point cloud image is aggregated with one or more previous aggregate point cloud images to generate a current aggregate point cloud image; and
        generate a mesh based on the current aggregate point cloud image, the mesh including a set of vertices, wherein generating the mesh comprises assigning individual vertices of the mesh to individual points represented in the current aggregate point cloud image,
    wherein generating the current aggregate point cloud image comprises assigning weights to the current point cloud image and the one or more previous aggregate point cloud images.

2. The system of claim 1, further comprising:
    a client device configured to be worn on a head of a user;
    one or more image-forming components incorporated into the client device, the one or more image-forming components being configured to generate light rays to form images of virtual content and provide the images to one or both eyes of the user; and
    wherein the one or more physical processors are further configured by the machine-readable instructions to:
        control the one or more image-forming components to generate an image forming a virtual object, the virtual object being perceived at a first position in the real world;
        determine, from the output signals, a second position of the user object, the second position of the user object corresponding to a position of the mesh such that the mesh is also at the second position;
        determine, based on the first position and the second position, a portion of overlap between the mesh and the virtual object; and
        control the one or more image-forming components to modify the image of the virtual object based on the portion of overlap, the modification including removing one or more parts of the virtual object that correspond to the portion of overlap so as to cause the virtual object to be perceived as being occluded by the user object.

3. The system of claim 2, wherein the one or more image-forming components are configured such that when the client device is installed on the head of the user, the images are presented to the user and superimposed over views of the real world to create an augmented reality environment.

4. The system of claim 3, wherein the distancing device is incorporated into the client device.

5. The system of claim 1, wherein the one or more physical processors are further configured by the machine-readable instructions to:
    determine, based on the output signals, an estimated velocity of the user object; and
    adjust the weights based on the estimated velocity.

6. The system of claim 5, wherein determining the weights based on the estimated velocity comprises:
    increasing the weight for the current point cloud image and decreasing the weight for the one or more previous aggregate point cloud images as the estimated velocity increases; and
    decreasing the weight for the current point cloud image and increasing the weight for the one or more previous aggregate point cloud images as the estimated velocity decreases.

7. The system of claim 1, wherein generating the mesh further comprises blurring edges of the mesh.

8. The system of claim 1, wherein the point cloud images are generated by projecting the point cloud on a concave spherical surface.

9. The system of claim 1, wherein the distancing device includes one or more of a camera, a three-dimensional scanner, a depth sensor, a rangefinder, a laser gauge, a time-of-flight sensor, a volumetric imaging sensor, an IR camera/emitter pair, a passive structured light stereo pair, or a passive unstructured light stereo pair.

10. A method to simulate physical objects occluding virtual objects within an interactive space, the method comprising:
    obtaining output signals conveying three-dimensional positions of surfaces of real-world objects, the real-world objects including a user object, wherein the three-dimensional positions are conveyed in a point cloud, the point cloud including a set of points that lie on the surfaces of the user object; and
    obtaining, from the output signals, point cloud images, an individual point cloud image depicting a two-dimensional representation of the point cloud;
    generating aggregate point cloud images over time, such that a current point cloud image is aggregated with one or more previous aggregate point cloud images to generate a current aggregate point cloud image; and generating a mesh based on the current aggregate point cloud image, the mesh including a set of vertices, wherein generating the mesh comprises assigning individual vertices of the mesh to individual points represented in the current aggregate point cloud image, wherein generating the current aggregate point cloud image comprises assigning weights to the current point cloud image and the one or more previous aggregate point cloud images.

11. The method of claim 10, further comprising:

generating light rays to form images of virtual content and providing the images to one or both eyes of the user, the images including an image forming a virtual object, the virtual object being perceived at a first position in the real world;

determining, from the output signals, a second position of the user object, the second position of the user object corresponding to a position of the mesh such that the mesh is also at the second position;

determining, based on the first position and the second position, a portion of overlap between the mesh and the virtual object; and modifying the image of the virtual object based on the portion of overlap, the modification including removing one or more parts of the virtual object that correspond to the portion of overlap so as to cause the virtual object to be perceived as being occluded by the user object.

12. The method of claim 11, wherein the images are presented to the user and superimposed over views of the real world to create an augmented reality environment.

13. The method of claim 10, wherein the output signals are obtained from a distancing device.

14. The method of claim 10, further comprising:

determining, based on the output signals, an estimated velocity of the user object; and adjusting the weights based on the estimated velocity.

15. The method of claim 14, wherein determining the weights based on the estimated velocity comprises:

increasing the weight for the current point cloud image and decreasing the weight for the one or more previous aggregate point cloud images as the estimated velocity increases; and decreasing the weight for the current point Cloud image and increasing the weight for the one or more previous aggregate point cloud images as the estimated velocity decreases.

16. The method of claim 10, wherein generating the mesh further comprises blurring edges of the mesh.

17. The method of claim 10, wherein the point cloud images are generated by projecting the point cloud on a concave spherical surface.

18. The method of claim 13, wherein the distancing device includes one or more of a camera, a three-dimensional scanner, a depth sensor, a rangefinder, a laser gauge, a time-of-flight sensor, a volumetric imaging sensor, an IR camera/emitter pair, a passive structured light stereo pair, or a passive unstructured light stereo pair.

* * * * *